US008551325B2

(12) United States Patent
Hamamatsu et al.

(10) Patent No.: US 8,551,325 B2
(45) Date of Patent: Oct. 8, 2013

(54) PROCESS FOR PRODUCING HYDROCARBON OIL

(75) Inventors: Tatsuo Hamamatsu, Yokohama (JP); Hideki Ono, Yokohama (JP); Yasutoshi Iguchi, Yokohama (JP); Hideshi Iki, Yokohama (JP); Yoshihiko Kinoshita, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 331 days.

(21) Appl. No.: 13/119,310

(22) PCT Filed: Sep. 16, 2009

(86) PCT No.: PCT/JP2009/066158
§ 371 (c)(1),
(2), (4) Date: Jun. 1, 2011

(87) PCT Pub. No.: WO2010/032748
PCT Pub. Date: Mar. 25, 2010

(65) Prior Publication Data
US 2011/0237853 A1    Sep. 29, 2011

(30) Foreign Application Priority Data

Sep. 18, 2008 (JP) .............................. P2008-239791

(51) Int. Cl.
*C10G 45/02* (2006.01)
*C07C 1/20* (2006.01)

(52) U.S. Cl.
USPC ............. 208/95; 208/143; 208/144; 208/263; 208/289; 585/240

(58) Field of Classification Search
USPC ............ 585/240, 250; 208/95, 143, 144, 263, 208/264, 289
See application file for complete search history.

(56) References Cited

U.S. PATENT DOCUMENTS

| 7,232,935 B2 * | 6/2007 | Jakkula et al. ................ 585/240 |
| 2006/0207166 A1 * | 9/2006 | Herskowitz et al. ............ 44/385 |
| 2009/0112041 A1 | 4/2009 | Germaine et al. |
| 2009/0229172 A1 * | 9/2009 | Brady et al. .................... 44/307 |

FOREIGN PATENT DOCUMENTS

| CN | 1958728 | 5/2007 |
| CN | 101198675 | 6/2008 |
| EP | 1396531 | 3/2004 |
| JP | 2000-328070 | 11/2000 |
| JP | 2005-154647 | 6/2005 |
| JP | 2007-153928 | 6/2007 |
| JP | 2007-308563 | 11/2007 |
| JP | 2009-019175 | 1/2009 |
| WO | 2006/100584 | 9/2006 |
| WO | 2007/063874 | 6/2007 |
| WO | 2007/068796 | 6/2007 |
| WO | 2007/068800 | 6/2007 |
| WO | 2007/132843 | 11/2007 |
| WO | 2007/142013 | 12/2007 |

OTHER PUBLICATIONS

Notice of Allowance issued with respect to patent family member Japanese Patent Application No. 2008-239791, mailed Aug. 14, 2012.
Notice of Allowance issued with respect to Japanese Patent Application No. 2008-239821, mailed Aug. 14, 2012.
U.S. Appl. No. 13/119,333 to Yasutoshi Iguchi et al., which was filed on Mar. 16, 2011.
"Cleaning up chlorine", Mine & Quarry 25 (50, Jun. 1996, pp. 33-34, 36, 38.

* cited by examiner

*Primary Examiner* — Walter D Griffin
*Assistant Examiner* — Renee E Robinson
(74) *Attorney, Agent, or Firm* — Greenblum & Bernstein, P.L.C.

(57) ABSTRACT

A method for manufacturing a hydrocarbon oil, comprising: a first step wherein a feedstock oil containing an oxygen-containing organic compound and a water-insoluble chlorine-containing compound is brought into contact with a hydrogenation catalyst comprising a support containing a porous inorganic oxide and one or more metals selected from Group VIA and Group VIII of the periodic table supported on the support in the presence of hydrogen to generate a hydrocarbon oil and water in a vapor state by the hydrodeoxygenation of an oxygen-containing organic compound and convert the water-insoluble chlorine-containing compound into a water-soluble chlorine-containing compound; a second step wherein the water in the reaction product of the first step is maintained in a vapor state and the reaction product of the first step is brought into contact with a nitrogen-containing Brønsted base compound which has a boiling point at normal pressure of 100° C. or less and is water-soluble to obtain a product to be treated; and a third step wherein the product to be treated is cooled to a temperature not higher than the temperature at which water in a vapor state is liquefied to form an aqueous phase containing a water-soluble chlorine-containing compound and a nitrogen-containing Brønsted base compound and then separate the aqueous phase from an oil to be treated to obtain a product oil containing a hydrocarbon oil.

9 Claims, No Drawings

PROCESS FOR PRODUCING HYDROCARBON OIL

TECHNICAL FIELD

The present invention relates to a method for manufacturing a hydrocarbon oil.

BACKGROUND ART

Attention is paid to effective utilization of biomass energy as a preventive measure for global warming. Among biomass energy, since biomass energy derived from plants can effectively use hydrocarbon converted from carbon dioxide by photosynthesis during the growth process of plants, it has a property which is the so-called carbon neutrality and does not contribute to an increase in carbon dioxide in the atmosphere from the viewpoint of the life cycle.

The utilization of such biomass energy has been widely studied even in the field of a transportation fuel. For example, if a fuel derived from an animal or vegetable oil can be used as a diesel fuel, it is expected to play an important role in the reduction of carbon dioxide emission by the synergistic effect with the high energy efficiency of a diesel engine. As a diesel fuel using an animal or vegetable oil, a fatty acid methyl ester oil is known. The fatty acid methyl ester oil is manufactured by subjecting a triglyceride, which is a general structure of an animal or vegetable oil, to ester exchange with methanol by a basic catalyst or the like.

However, as described in Patent Document 1, it is pointed out that the process for manufacturing the fatty acid methyl ester oil has problems. For example, a by-product glycerin is required to be treated and cost and energy are required for cleaning of a product oil, or the like.

In order to use an oil and fat component derived from an animal or vegetable oil or a fuel manufactured by using the component as a raw material, in addition to the above problems, there are the following problems. Specifically, since an oil and fat component derived from an animal or vegetable oil generally has oxygen atoms in the molecule, there is concern that the oxygen content may adversely affect the engine material, and the oxygen content is difficult to remove to an extremely low concentration. In addition, when mixing the oil and fat component derived from an animal or vegetable oil and a petroleum hydrocarbon fraction and using the mixture, the prior art cannot sufficiently reduce both the oxygen content in the oil and fat component and the sulfur content in a petroleum hydrocarbon fraction.

Consequently, a method of manufacturing a fuel oil comprising a hydrocarbon oil by subjecting a oil and fat component derived from an animal or vegetable oil to deoxygenation by hydrogenation (hydrodeoxygenation) is studied (for example, refer to Patent Document 2 and Patent Document 3).

CITATION LIST

Patent Literature

[Patent document 1] Japanese Patent Laid-Open No. 2005-154674
[Patent document 2] EP1396531A2
[Patent document 3] WO2006/100584A2

SUMMARY OF INVENTION

Technical Problem

According to studies of the present inventor, it has been found that a material containing a chlorine content which is difficult to remove by washing with water or the like exists in an oil and fat derived from an animal or vegetable oil. If a chlorine content is contained in a fuel oil, there is concern that it may adversely affect constituent members of an engine and an exhaust gas treatment catalyst.

The water-soluble compound containing a chlorine content which is generated by hydrogenation of an oil and fat derived from an animal or vegetable oil containing chlorine is an acidic compound typified by hydrogen chloride. Since an aqueous solution which is obtained by dissolving the compound in water corrodes a metal which is an apparatus material, the risk of leak of a flammable gas is high and the compound may cause an increase in apparatus cost such as because of the requirement of an expensive corrosion-resistant material.

Consequently, an object of the present invention is to provide a method which is capable of preventing the corrosion of an apparatus material due to a by-product water-soluble chlorine-containing compound when a hydrocarbon oil is manufactured by using a feedstock oil containing an oxygen-containing organic compound and a water-insoluble chlorine-containing compound.

Solution to Problem

In order to solve the above problems, the present invention provides a method for manufacturing a hydrocarbon oil, comprising: a first step wherein a feedstock oil containing an oxygen-containing organic compound and a water-insoluble chlorine-containing compound is brought into contact with a hydrogenation catalyst comprising a support containing a porous inorganic oxide and one or more metals selected from Group VIA and Group VIII of the periodic table supported on the support in the presence of hydrogen to generate a hydrocarbon oil and water in a vapor state by the hydrodeoxygenation of the oxygen-containing organic compound and convert the water-insoluble chlorine-containing compound into a water-soluble chlorine-containing compound; a second step wherein the water in the reaction product of the first step is maintained in a vapor state and the reaction product of the first step is brought into contact with a nitrogen-containing Brønsted base compound which has a boiling point at normal pressure of 100° C. or less and is water-soluble to obtain a product to be treated; and a third step wherein the product to be treated is cooled to a temperature not higher than the temperature at which water in a vapor state is liquefied to form an aqueous phase containing a water-soluble chlorine-containing compound and a nitrogen-containing Brønsted base compound and then separate the aqueous phase from an oil to be treated to obtain a product oil containing a hydrocarbon oil.

The term "hydrodeoxygenation" as used herein means a treatment in which oxygen atoms constituting an oxygen-containing organic compound are removed and hydrogen is added to the cleaved sites. For example, a fatty acid triglyceride and a fatty acid have each an oxygen-containing group such as an ester group and a carboxyl group, but the oxygen atoms contained in these oxygen-containing groups are removed by hydrodeoxygenation reaction and the oxygen-containing hydrocarbon compound is converted into a hydrocarbon. There are mainly two reaction pathways for the hydrodeoxygenation of an oxygen-containing group which a fatty acid triglyceride and the like have. The first reaction pathway is a hydrogenation pathway in which the oxygen-containing group is reduced through aldehyde and alcohol while the carbon number of the fatty acid triglyceride and the like is maintained. In this case, the oxygen atoms are converted into water. The second reaction pathway is a decarboxylation pathway in which the oxygen-containing group of the fatty acid triglyceride and the like are directly released as carbon dioxide, and the oxygen atoms are removed as carbon dioxide. In the hydrodeoxygenation in the present invention, these reactions proceed in parallel, and in the hydrogenation of an oil to be treated (feedstock oil) containing oils and fats derived from an animal or vegetable oil, hydrocarbon, water and carbon dioxide are generated.

The reaction schemes of the hydrodeoxygenation as an example of a triglyceride of stearic acid are shown in the following formulas (1) and (2). The reaction scheme represented by the formula (1) corresponds to the first reaction pathway, and the reaction scheme represented by the formula (2) corresponds to the second reaction pathway.

  (1)

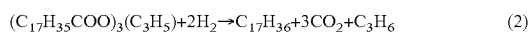  (2)

In the first step according to the present invention, in addition to hydrodeoxygenation, hydroisomerization may occur. The term "hydroisomerization" as used herein means the isomerization from a linear hydrocarbon chain skeleton to a branched hydrocarbon chain skeleton by hydrogenation. That is, the term "hydroisomerization" as used herein includes, in addition to the isomerization from a normal paraffin to an isoparaffin, the isomerization from the linear hydrocarbon chain of an oxygen-containing organic compound having a linear hydrocarbon chain to a branched hydrocarbon chain. In the hydroisomerization, the molecular formula in the reactant and product does not change, leading to no substantial increase or decrease of the constituent elements.

According to the method for manufacturing a hydrocarbon oil of the present invention, even when a feedstock oil containing an oxygen-containing organic compound and a water-insoluble chlorine-containing compound are used, it is possible that an oxygen content or an unsaturated content in the resulting hydrocarbon oil is sufficiently reduced and a water-insoluble chlorine-containing compound contained in a feedstock oil is effectively and securely converted into a water-soluble chlorine-containing compound. That is, a hydrogenation catalyst used in the present invention exhibits high catalytic activity for the hydrodeoxygenation of an oxygen-containing organic compound and the conversion reaction from a water-insoluble chlorine-containing compound to a water-soluble chlorine-containing compound.

Here, an aqueous solution, which is obtained by dissolving the generating water-soluble chlorine-containing compound, which is an acidic substance, in water, has corrosive properties to a metal. Especially, even if an aqueous solution of hydrogen chloride has a hydrogen chloride concentration of several tens of ppm, for example, a stress corrosion crack occurs to the site of a stainless steel to which stress is applied.

It has been conventionally known that a reaction product containing an acidic substance is subjected to neutralization, but in the usual neutralization process, generally, once a aqueous phase is formed, the neutralization is carried out in a neutralization tank. This neutralization process cannot be employed for the present reaction in which when the reaction product is dissolved in water, corrosion starts.

Consequently, in the present invention, attention is paid to the point where if the generating water is in a vapor state, a chlorine-containing compound does not exhibit corrosive properties, and there is employed a method of neutralizing a water-soluble chlorine-containing compound by bringing the reaction product into contact with a nitrogen-containing Brønsted base compound having a boiling point lower than that of water while maintaining the water in the vapor state. In addition, the term "Brønsted base" as used herein refers to a compound which may be an acceptor of hydrogen ions as defined by Bronsted.

Since the water-soluble chlorine-containing compound having corrosive properties of the present invention has a boiling point lower than that of water, if water is in a vapor state, the chlorine-containing compound is also in a vaporized state. In order to neutralize the chlorine-containing compound by effectively allowing a base compound to act on the compound, the base compound is preferably also in a vaporized state. That is, preferred is a base compound having a boiling point at normal pressure of 100° C. or less, which is lower than that of water.

In addition, there is considered a method of using an aqueous solution of alkali such as sodium hydroxide which is a strong base or a hydroxide of an alkaline earth metal instead of a nitrogen-containing Brønsted base compound which is a weak base. However, in the present treatment conditions, since only water is evaporated and the metal hydroxide is separated as a solid, not only the yield is poor, but also it is difficult to continuously pour the aqueous solution because the metal hydroxide blocks the pipes and the like.

Further, there is considered a method of using an adsorption layer comprising an alkali or alkaline earth metal supported on a porous support, but long-term stable operation is difficult because there is deterioration such as reduction in the strength of an adsorbent due to the water vapor.

Since an aqueous solution, which is obtained by dissolving a salt of a nitrogen-containing Brønsted base compound and an acidic chlorine-containing compound in water, has no corrosive properties to a metal, it is possible to easily separate the solution from the hydrogenated oil as a non-corrosive aqueous solution even if the solution is cooled.

In addition, in the present invention, an oxygen content in the feedstock oil preferably is 1 to 15% by mass and a chlorine content in the feedstock oil preferably is 0.1 to 50 ppm by mass, based the total amount of the feedstock oil.

Here, the term "oxygen content" as used herein refers to an oxygen content as measured according to the method described in UOP-649. Further, the term "chlorine content" as used herein refers to a chlorine content as measured according to the method described in IP PROPOSED METHOD AK/81 "Determination of the chlorine content of light and middle distillates by oxidative microcoulometry".

In addition, in the first step according to the present invention, 2 to 1200 kg of water is preferably produced as a by-product per g of chlorine content in the feedstock oil.

Further, in the second step according to the present invention, 0.4 to 8 g in terms of nitrogen atom of the nitrogen-containing Brønsted base compound per gram of a chlorine content in the feedstock oil is preferably brought into contact with the reaction product.

In addition, in the present invention, the nitrogen-containing Brønsted base compound is preferably ammonia.

Further, in the present invention, preferably, the oxygen-containing organic compound contained in the feedstock oil is an oil and fat derived from an animal or vegetable oil and the ratio of a fatty acid and/or a compound having an ester structure to the oil and fat derived from an animal or vegetable oil is 90% by mole or more.

In addition, in the present invention, the porous inorganic compound comprising the hydrogenation catalyst preferably comprises two or more elements selected from aluminum, silicon, zirconium, boron, titanium and magnesium.

Further, in the first step according to the present invention, the feedstock oil and the hydrogenation catalyst are preferably brought into contact together under the conditions of a hydrogen pressure of 2 to 10 MPa, a liquid hourly space velocity of 0.1 to 3.0 h$^{-1}$, a hydrogen/oil ratio of 150 to 1500 NL/L and a reaction temperature of 150 to 380° C.

In addition, in the present invention, preferably an oxygen content in the product oil is 1% by mass or less, a chlorine content in the product oil is 0.1 ppm by mass or less and an iodine value in the product oil is 0.1 or less, based on the total amount of the product oil.

Here, the term "iodine value" as used herein refers to a value measured according to the method described in JIS K 0070 "Test methods for acid value, saponification value, ester value, iodine value, hydroxyl value and unsaponifiable matter of chemical products".

Advantageous Effects of Invention

As described above, according to the method for manufacturing a hydrocarbon oil of the present invention, in manufacturing a hydrocarbon oil using a feedstock oil containing an oxygen-containing organic compound and a water-insoluble chlorine-containing compound, it is possible that the oxygen content or unsaturated content in the resulting hydrocarbon oil is sufficiently reduced and the chlorine-containing compound contained in the feedstock oil is effectively and securely removed without corroding the apparatus and unit.

DESCRIPTION OF EMBODIMENTS

Hereinafter, the preferred embodiments of the present invention will be described in detail.

The first step according to the present invention is a step wherein a feedstock oil containing an oxygen-containing organic compound and a water-insoluble chlorine-containing compound is brought into contact with a hydrogenation catalyst comprising a support containing a porous inorganic oxide and one or more metals selected from Group VIA and Group VIII of the periodic table supported on the support in the presence of hydrogen to generate a hydrocarbon oil and water in a vapor state by the hydrodeoxygenation of the oxygen-containing organic compound and convert the water-insoluble chlorine-containing compound into a water-soluble chlorine-containing compound to obtain a reaction product containing a hydrocarbon oil, water (in a vapor state) and a water-soluble chlorine-containing compound.

In the present invention, a feedstock oil containing an oxygen-containing organic compound and a water-insoluble chlorine-containing compound is used. The oxygen-containing organic compound preferably has a structure having a carboxylic acid group or an ester group, for example, includes an oil and fat component derived from an animal or vegetable oil. Here, the term "oil and fat component derived from an animal or vegetable oil" refers to an oil and fat component derived from a natural animal or vegetable oil, an oil and fat component obtained by separating and refining the natural animal or vegetable oil or an oil and fat derivative produced or manufactured by chemical conversion of these feedstocks, and includes a composition with a component which is added for the purpose of maintaining and improving the performance of these and products thereof.

The oil and fat component derived from an animal or vegetable oil includes, for example, animal fat, rapeseed oil, soybean oil and palm oil. In the present invention, as the oil and fat component derived from an animal or vegetable oil, any of oils and fats may be used, and waste oil obtained after using these oils and fats may be used. However, preferred is a fat and oil derived from a plant from the carbon neutral viewpoint, and more preferred are rapeseed oil, soybean oil and palm oil from the viewpoint of the carbon number of the fatty acid alkyl chain and the reactivity. In addition, the oils and fats may be used alone or may be used by mixing two or more kinds of them.

The oil and fat component derived from an animal or vegetable oil generally has a fatty acid triglyceride structure, but may contain other fatty acids or an oil and fat component which is processed into an ester such as a fatty acid methyl ester. However, since energy is consumed when a fatty acid or fatty acid ester is manufactured from an oil and fat component derived from a plant, carbon dioxide is generated, and it is preferable to use a vegetable oil and fat consisting mainly of a compound having inherently a triglyceride structure from the viewpoint of reducing the emission of carbon dioxide.

In the present invention, the ratio of an oxygen-containing organic compound having a fatty acid and/or an ester structure to an oxygen-containing organic compound contained in a feedstock oil is preferably 90% by mole or more, more preferably 92% by mole or more and much more preferably 95% by mole or more. Furthermore, among the oxygen-containing organic compounds having an ester structure, a compound having a triglyceride structure is preferable from the viewpoint of reducing the emission of carbon dioxide.

In addition, the feedstock oil may contain, in addition to the oil and fat component derived from an animal or vegetable oil, a compound derived from chemicals such as plastics or a solvent, as an oxygen-containing organic compound, and may contain a synthetic oil obtained by using a synthetic gas comprising carbon monoxide and hydrogen as a raw material through Fischer-Tropsch reaction.

An oxygen content in the feedstock oil is preferably 1 to 15% by mass, more preferably 2 to 15% by mass, much more preferably 3 to 14% by mass and especially preferably 5 to 13% by mass, based on the total amount of the feedstock oil. If the oxygen content is less than 1% by mass, the amount of water produced as a by-product by hydrodeoxygenation becomes insufficient and the removal efficiency of the chlorine content tends to be decreased. If oxygen content exceeds 15% by mass, facilities required for treating water produced as a by-product are required, and the catalytic activity of the hydrogenation catalyst tends to decrease and the catalyst strength tends to decrease due to the interaction between water and a catalyst support.

In addition, the feedstock oil contains a water-insoluble chlorine-containing compound. Further, although the cause that a water-insoluble chlorine-containing compound is contained in the feedstock oil is not always clarified, it is presumed that there may be a chlorine-containing compound which is involved in the metabolic system of an animal or plant, a photosynthesis system of a plant and the like, and in some cases, the chlorine-containing compound may be possibly derived from agricultural chemicals and the like which are used when plants are cultivated It is useful that the feedstock oil having a water-insoluble chlorine-containing compound can be used in the present invention in that the degree of freedom in selecting the feedstock oil subjected to hydrodeoxygenation becomes large. In addition, the feedstock oil used in the present invention may further contain a water-soluble chlorine-containing compound. The judgment whether a chlorine-containing compound is water-soluble or water-insoluble may be carried out, for example, by quantifying the chlorine content at the aqueous phase side after mixing a sample and the same amount of distilled water in normal temperature and shaking the resulting mixture for a fixed period of time.

A chlorine content in the feedstock oil is preferably 0.1 to 50 ppm by mass and more preferably 0.1 to 20 ppm by mass, based on the total amount of the feedstock oil. If the chlorine content in the feedstock oil exceeds 50 ppm by mass, since chlorine and hydrogen chloride produced as a by-product at the time of hydrodeoxygenation or the amount as a chloride ion are increased, a large amount of a nitrogen-containing Brønsted base compound is required in the second step and these may be incorporated in a fuel product.

In addition, the oil and fat component derived from an animal or vegetable oil may contain an oil and fat having an olefin structure. For this reason, an olefin content may be present in the feedstock oil containing an oil and fat component derived from an animal or vegetable oil, but the presence of the olefin content may be confirmed by the iodine value. In the present invention, the feedstock oil preferably has an iodine value of 145 or less. If the iodine value exceeds 145, the reaction efficiency of the hydrodeoxygenation of an oxygen-containing organic compound or the conversion reaction (dechlorination reaction and the like) from a water-insoluble chlorine-containing compound to a water-soluble chlorine-containing compound tends to be decreased, and the reaction control tends to become difficult because heat generation becomes large due to the hydrogenation of olefin.

Further, the feedstock oil may comprise only an oil and fat component derived from an animal or vegetable oil and may be mixed with other base stocks. The other base stocks may be a petroleum faction, a fraction obtained by distilling crude oil and further a fraction obtained by subjecting these fractions to a refining step such as hydrodesulfurization and cracking. Furthermore, the other base stocks may be fuel oil fractions obtained by refining a hydrocarbon oil obtained by the hydrogenation of the present invention or a fraction obtained by isomerizing the fuel oil fractions. The other base stocks to be mixed have a boiling point of preferably 100 to 400° C. and more preferably 160 to 390° C. If an oil and fat component derived from an animal or vegetable oil is used for the method for manufacturing a hydrocarbon oil of the present invention, a fraction having a boiling point corresponding to that of a gas oil is mainly obtained, but if the base stock to be mixed has a boiling point lower than 100° C., the resulting fraction may not satisfy quality specifications such as flash point and kinetic viscosity as a gas oil base stock. In addition, if the base stock has a boiling point higher than 400° C., there is concern that the reactivity in the first step decreases and the exhaust gas deteriorates, because when used as a fuel oil particulates are likely to be generated.

Further, in the first step according to the present invention, there is used a hydrogenation catalyst comprising a support containing a porous inorganic oxide and one or more metals selected from Group VIA and Group VIII of the periodic table supported on the support. As the support of the hydrogenation catalyst, preferred are two or more elements selected from aluminum, silicon, zirconium, boron, titanium, magnesium and zeolite from the viewpoint of being capable of further improving the catalytic activity for the hydrodeoxygenation and the conversion reaction (dechlorination reaction and the like) from a water-insoluble chlorine-containing compound to a water-soluble chlorine-containing compound, and more preferred is an inorganic oxide (including composite oxide of an aluminum oxide and other oxides) containing aluminum and other elements.

If the porous inorganic oxide contains aluminum as a constituent element, the content of aluminum is preferably 10% by mass or more, more preferably 15% by mass or more and much more preferably 20% by mass or more in terms of aluminum, based on the total amount of the porous inorganic oxide. If the content of aluminum is less than 10% by mass in terms of aluminum, the physical properties such as the acid properties of the catalyst and the strength and surface area of the catalyst becomes insufficient and the activity tends to decrease.

There is no particular limitation on a method for introducing silicon, zirconium, boron, titanium and magnesium, which are constituent elements of a support other than aluminum, into a support, and a solution containing these elements or the like may be used as a raw material. For example, there may be used silicic acid, sodium silicate solution and silica sol and the like as silicon; boric acid and the like as boron; phosphoric acid or an alkali metal salt of phosphoric acid or the like as phosphorus; titanium sulfide, titanium tetrachloride, various alkoxide salts or the like as titanium; and zirconium sulfate or various alkoxide salts or the like as zirconium.

The porous inorganic oxide preferably comprises two or more elements among aluminum, silicon, zirconium, boron, titanium and magnesium, and more preferably comprises two or more elements among aluminum, silicon, zirconium and titanium.

The support of the hydrogenation catalyst used in the present invention may contain a zeolite as the porous inorganic oxide. When a zeolite is used, a zeolite having a crystalline structure such as FAU, BEA, MOR, MFI, MEL, MWW, TON, AEL and MTT, among the structure codes specified by the International Zeolite Association is preferably used.

On the porous inorganic oxide as a support, two or more metals selected from Group VIA and Group VIII elements of the periodic table are supported. Among these metals, preferred are one or more metals selected from Ni, Co, Pt, Pd, Ru, Rh, Ir, Mo and W, and more preferred are one or more metals selected from Ni, Pt, Pd, Ru and Mo. Combinations of metals include Ni—Mo, Ni—W, Co—Mo, Co—W, Ni—Co—Mo, Pt—Pd, Pt—Ru, Pt—Rh and Pt—Ir, among which more preferred are Ni—Mo, Co—Mo, Pt—Pd and Pt—Ru. The hydrogenation catalyst used in the present invention may be also used in combination with a porous inorganic oxide and/or a plurality of catalysts different in active metal species.

The method for supporting a metal on a support is not particularly limited and a well-known method which is applied when producing a usual hydrogenation catalyst may be employed. In general, a method of impregnating a solution containing a salt of an active metal into a catalyst support may be preferably employed. In addition, an equilibrium adsorption method, a pore-filling method, an incipient-wetness method and the like are preferably employed. For example, the pore-filling method is a method in which the pore volume of a support is measured in advance and then the support is impregnated with the same volume of a metal salt solution. In addition, the impregnation method is not particularly limited, and a support may be impregnated by a suitable method depending on the supported amount of the metal and physical properties of the catalyst support. The metal sources such as nitrate and sulfate salts of these metals or a complex salt form of these metals are dissolved in an aqueous solution or a suitable organic solvent, and the resulting solution is used as an impregnation solution.

The first process according to the present invention may be suitably carried out, for example, by using a fixed bed reactor. Hydrogen may be supplied by either a counter flow system or a cocurrent flow system for the oil to be treated (feedstock oil). In addition, when a plurality of reactors is used, a combination of a counter flow system and a cocurrent flow system may be employed. A cocurrent gas-liquid downflow system may be employed as the general form. Further, the reactor may be used alone or in combination of a plurality of reactors. In addition, a structure in which the inside of a reactor is divided into a plurality of catalyst beds may be employed. Further, the hydrogenation catalyst may be used in combination of a plurality kind of hydrogenation catalysts, and the type and amount used of the hydrogenation catalyst and reaction conditions may be set according to the performance of the hydrodeoxygenation reaction, hydroisomerization and the like.

In addition, generally, the hydrogen gas introduced into the reactor together with the feedstock oil is introduced from the inlet of the first reactor together with the feedstock oil before or after passing through a heating furnace for increasing temperature to a predetermined reaction temperature. However, apart from this, the hydrogen gas may be introduced from between the catalyst beds or from between a plurality of reactors for the purpose of controlling the temperature inside of the reactor and maintaining the hydrogen pressure over the whole inside of the reactor (quench hydrogen). Alternatively, there may be introduced a part of any of or plural combinations of a product oil, an unreacted oil, a reaction intermediate oil and the like from between the reactor inlets or the catalyst beds or from between a plurality of reactors or the like. Thus, an excessive cracking reaction or a runaway reaction caused by the increase of the reaction temperature can be avoided by controlling the reaction temperature.

The reaction conditions in the first step are preferably a hydrogen pressure of 2 to 10 MPa, a liquid hourly space velocity (LHSV) of 0.1 to 3.0 h$^{-1}$ and a hydrogen oil ratio (hydrogen/oil ratio) of 150 to 1500 NL/L; more preferably a hydrogen pressure of 2 to 8 MPa, a liquid hourly space velocity (LHSV) of 0.2 to 2.5 h$^{-1}$ and a hydrogen oil ratio (hydrogen/oil ratio) of 200 to 1200 NL/L; and much more preferably a hydrogen pressure of 3 to 7 MPa, a liquid hourly space velocity (LHSV) of 0.3 to 2.0 h$^{-1}$ and a hydrogen oil ratio (hydrogen/oil ratio) of 250 to 1000 NL/L. All of these conditions are factors having an influence on the reaction activity of the catalyst, for example, if the hydrogen pressure and the hydrogen oil ratio are less than the above lower limits, the reactivity tends to be decreased and the catalytic activity tends to be rapidly decreased. On the other hand, if the hydrogen pressure and the hydrogen oil ratio exceed the above upper limits, an excessive investment in equipment such as a compressor tends to be required. In addition, the lower the liquid hourly space velocity is, the higher tendency to be advantageous for the reaction. However, if the liquid hourly space velocity is less than the above lower limit, a reactor having an extremely large internal volume is required and an excessive investment in equipment tends to be required. On the other hand, if the liquid hourly space velocity exceeds the above upper limits, the reaction does not tend to sufficiently proceed.

The reaction temperature in the first step is in the range of preferably 150 to 380° C., more preferably 180 to 370° C., much more preferably 220 to 360° C. and especially preferably 260 to 350° C. If the reaction temperature is less than 150° C., the hydrodeoxygenation reaction, the conversion reaction (dechlorination reaction and the like) from a water-insoluble chlorine-containing compound to a water-soluble chlorine-containing compound (dechlorination reaction and the like) or further the olefin hydrogenation reaction tend to be difficult to proceed. On the other hand, if the reaction temperature exceeds 380° C., excessive cracking, polymerization of the feedstock oil or other side reactions may proceed, and the ratio of the decarboxylation reaction (the second reaction pathway, formula (2)) to the reaction in which water is produced as a by-product at the time of the hydrodeoxygenation (the first reaction pathway, formula (1)) is increased and the amount of water produced as a by-product for retaining a water-soluble chlorine-containing compound tends to become insufficient.

In the first step, the amount of water produced as a by-product accompanied by the hydrodeoxygenation may be arbitrarily adjusted by adjusting the above reaction conditions. The amount of water produced as a by-product is preferably 2 to 1200 kg, more preferably 5 to 1000 kg and especially preferably 10 to 500 kg per gram of the chlorine content in the feedstock oil.

The reaction product obtained in the first step contains a hydrocarbon oil generated by the hydrodeoxygenation of an oxygen-containing organic compound, water produced as a by-product and a water-soluble chorine-containing compound converted from a water-insoluble chorine-containing compound. In the present invention, it is vital to maintain the water produced as a by-product in a vapor state from the viewpoint of corrosion protection of the apparatus and unit.

In order to maintain the water produced as a by-product in a vapor state, the temperature may be controlled so that the relation between the partial pressure $P_W$ (MPa) of the water produced as a by-product and the temperature T (° C.) at that time satisfies the conditions represented by the following formula (3), based on Tetens equation:

$$P_W < 6.11 \times 10^{\{7.5 \times T \div (T+237.3)\}} \times 10^{-4} \quad (3)$$

If it is assumed that the feedstock oil and the hydrogenated oil produced do not vaporize at all, the partial pressure is 0 MPa, and if the decarboxylation reaction does not occur, $P_w$ is represented by the ratio of the molar concentration $M_w$ of water for the reaction pressure P (units: MPa) to the sum of the molar concentration of water $M_w$ and the molar concentration $M_H$ of hydrogen and the molar concentration $M_P$ of propane, that is, the following formula (4):

$$P_W = P \times M_W \div (M_W + M_H + M_P) \quad (4)$$

For example, if it is assumed that the ideal hydrodeoxygenation reaction occurs for a triglyceride of stearic acid having a fatty acid carbon number of 18 with a hydrogen amount of 500 NL/L and at a reaction pressure of 5 MPa, the hydrogen present in the initial reaction system is 23.0 moles per mole of the triglyceride of stearic acid, because the hydrogen amount per L (865 g (0.97 moles)) of the triglyceride of stearic acid is 500 L (22.3 moles) assuming that the triglyceride of stearic acid has a molecular weight of 890 and a density of 0.865 g/cm$^3$. Since from the formula (1), 12 moles of hydrogen is consumed per mole of the triglyceride of stearic acid at 100% reaction, and 6 moles of water and 1 mole of propane are generated, $P_W$ is represented by the following formula (5) if the reaction rate is represented by C (%):

$$P_W = 5 \times (6 \times C) \div \{6 \times C + (23.0 \times 100 - 12 \times C) + 1 \times C\} \quad (5)$$

Accordingly, the condensation of the water generated may be prevented by controlling the temperature according to the reaction rate of the formula (5) depending on the properties of the feedstock oil, hydrogen oil ratio and reaction pressure.

The second step of the present invention is a step wherein the water in the reaction product of the first step is maintained in a vapor state and the reaction product of the first step is brought into contact with a water-soluble nitrogen-containing Brønsted base compound having a boiling point at normal pressure of 100° C. or less to obtain a mixture of a reaction product and a nitrogen-containing Brønsted base compound by neutralizing the acid water-soluble chlorine-containing compound.

In the second step, the water is maintained in a vapor state and an acidic chlorine-containing compound typified chlorine or hydrogen chloride is also in a vaporized state. Therefore, in order to allow the neutralization reaction to proceed efficiently, the nitrogen-containing Brønsted base compound should also be vaporized and subjected to gas-phase reaction in the second step. For that purpose, it is required that the nitrogen-containing Brønsted base compound has a boiling point lower than that of water, that is, 100° C. or less at normal pressure.

On the other hand, if the nitrogen-containing Brønsted base compound is a water-soluble compound, the theoretical neutralization amount or more of the nitrogen-containing Brønsted base compound may be added in order to securely prevent corrosion of a chlorine-containing compound, and unreacted additives (the unreacted nitrogen-containing Brønsted base compound) are finally dissolved in liquefied water and thus may be prevented from being incorporated in the hydrocarbon oil.

Such a nitrogen-containing Brønsted base compound includes ammonia, methylamine, dimethylamine, ethylamine, trimethylamine, ethylmethylamine, propylamine, isopropylamine, ethyldimethylamine, diethylamine, methylpropylamine, methylisopropylamine, butylamine, isobutylamine, sec-butylamine, tert-butylamine and the like. Especially preferred is ammonia which has the lowest boiling point and a high solubility to water.

As the amount of contact of a nitrogen-containing Brønsted base compound with the reaction product of the first step, since one nitrogen atom per one chlorine atom is neutralization equivalent, there may be used 0.39-fold by mass, which is obtained by dividing the atomic weight of nitrogen 14 by the atomic weight of chlorine 35.5, or more of nitrogen based on chlorine. On the other hand, even if an extremely excessive amount of a nitrogen-containing Brønsted base compound is a water-soluble compound, it is incorporated in a hydrocarbon oil, and for example, may adversely affect when a fuel product is produced, and thus it is not preferable to use 20 times or more the theoretical neutralization amount. In the present invention, since all of the chlorine content contained in the feedstock oil is converted into a water-soluble chlorine-containing compound, it is preferable to bring 1 g of the chlorine content in the feedstock oil into contact with 0.4 to 8 g in terms of nitrogen atom of a nitrogen-containing Brønsted base compound.

The method for bringing the reaction product of the first step into contact with a nitrogen-containing Brønsted base compound is not particularly limited and includes a method in which the reaction product and the base compound are flowed together into the pipe of the reactor outlet using a pump, or a method in which the reaction product and the base compound are added depending on the outflow from the reactor by installing a mixing tank at the subsequent stage of the reactor, or the like. In addition, it is needless to say that these units are adjusted to the vapor maintenance conditions according to the formulas (3) and (5).

Further, water may be added to the reaction product of the first step or a mixture of the second step, where necessary, and a mixture of a nitrogen-containing Brønsted base compound and water may be used in the second step. It should be noted that water becomes a vapor state in the second step, that is, the partial pressure of water including water added satisfies the formula (3) simultaneously or before the addition of a nitrogen-containing Brønsted base compound.

The third step of the present invention liquefies vapor by decreasing the temperature of the mixed solution obtained in the second step to a temperature at which the formula (3) is not established. At this time, the water-soluble chlorine-containing compound and a nitrogen-containing Brønsted base compound are transferred to the phase of water, but the aqueous solution has no corrosivity. And, a product oil containing a hydrocarbon oil is obtained by removing the water.

When water is separated from a reaction fluid, there may be applied a method which is employed in a general petroleum refining step and the like. For example, there may be mentioned a method of cooling a mixture of the reaction product obtained in the second step of the present invention and a nitrogen-containing Brønsted base compound with a cooler and introducing the mixture into a separator to separate into a gas phase consisting mainly of an unreacted hydrogen gas, an oil phase consisting mainly of a hydrocarbon oil and a aqueous phase, or a method of subjecting a mixture of the reaction product obtained in the second step and a nitrogen-containing Brønsted base compound to gas-liquid separation in a high-temperature, high-pressure separator into a gas phase consisting mainly of an unreacted gas and vapor and a liquid phase consisting mainly of a hydrocarbon oil and then introducing the gas phase side into a separator through a cooler to separate and collecting a condensed aqueous phase.

In addition, the gas phase consisting mainly of an unreacted hydrogen gas, which is separated from the oil phase and the aqueous phase in the third step of the present invention, may be added to hydrogen gas introduced into the reactor together with the feedstock oil by increasing the hydrogen purity by a common refining operation.

The product oil obtained through the first to third steps, which is sufficiently reduced in oxygen content and chlorine content, has an oxygen content of preferably 1% by mass or less, more preferably 0.8% by mass or less, further preferably 0.6% by mass or less, still further preferably 0.4% by mass or less and especially preferably 0.2% by mass or less based on the total amount of the product oil, from the viewpoint of oxidation stability.

In addition, from the viewpoint of reducing the adverse effect of the product oil on constituent members of an engine and an exhaust gas treatment catalyst when used for a fuel oil, a chlorine content in the product oil is preferably 0.1 ppm by mass or less based on the total amount of the product oil.

Further, the increase in the acid value after injection of an oxygen gas at 115° C. for 16 hours is preferably 0.25 mg KOH/g or less and more preferably 0.15 mg KOH/g or less based on the acid value before injection of an oxygen gas. The acid value is an indicator showing an acid component amount in 1 g of sample. If the increase in the acid value exceeds 0.25 mg KOH/g, the storage stability of the product oil tends to be deteriorated. In addition, the term "acid value" as used herein means an acid value measured according to the method described in test method for acid value in JIS K 2276 "Petroleum products—Testing methods for aviation fuels".

In addition, the product oil has an iodine value of preferably 0.1 or less from the viewpoint of oxidation stability. If the iodine value exceeds 0.1, the acid value tends to be significantly increased. Further, the term "iodine value" as used herein is a value measured according to the method described in JIS K 0070 "Test methods for acid value, saponification value, ester value, iodine value, hydroxyl value and unsaponifiable matter of chemical products".

The product oil obtained by the present invention, which usually consists mainly of a fraction having a boiling point range corresponding to that of a gas oil, may also contain, in addition to the fraction, a gas, a naphtha fraction, a kerosene fraction, a jet fraction. Consequently, these fractions may be fractionated by establishing a gas-liquid separation step or a fractionation step or the like at the subsequent stage of the second step, where necessary.

When the product oil or its fraction substantially consists of a hydrocarbon oil, it may be suitably used especially as a diesel gas oil, an aviation fuel base stock or a heavy oil base stock. In this case, the product oil or its fraction may be used alone as a diesel gas oil, an aviation fuel base stock or a heavy oil base stock, but can be used as a diesel gas oil, an aviation fuel base stock or a heavy oil base stock with which components such as other base stocks are mixed. As the other base stocks, there may be mixed a gas oil fraction and/or a kerosene fraction obtained in a common petroleum refining step and a residue fraction obtained by the method for manufacturing a hydrocarbon oil of the present invention. Further, there may be mixed a synthetic gas oil or a synthetic kerosene, which is obtained through the Fisher-Tropsch reaction and the like using a so-called synthetic gas comprising hydrogen and carbon monoxide as a raw material. The synthetic gas oil or synthetic kerosene is characterized in that it contains almost no aromatic content, mainly consists of saturated hydrocarbons and has a high cetane number. In addition, the method for manufacturing the synthetic gas is not particularly limited and a well-known method may be employed.

Furthermore, the product oil or its fraction is isomerized by a general method and the resulting fraction is also suitable as a diesel gas oil, an aviation fuel base stock or a heavy oil base stock. The isomerized fraction is especially improved in low-temperature fluidity.

EXAMPLES

Hereinafter, the present invention will be further specifically described based on Examples and Comparative Examples, but the present invention is not limited to the following Examples.

(Preparation of Catalyst)

A mixture was prepared by adding sodium silicate solution No. 3 to an aqueous solution of 5% by mass of sodium aluminate, and the mixture was placed in a vessel kept at a temperature of 65° C. On the other hand, in a separate vessel kept at a temperature of 65° C., a solution was prepared by adding phosphoric acid (concentration: 85%) to an aqueous solution of 2.5% by mass of aluminum sulfate, and into the resulting solution the solution containing sodium aluminate was fallen in drops. The addition of the solution was stopped when the mixture solution reached pH 7.0. The resulting slurry product was filtered out to obtain a cake slurry.

The cake slurry was transferred in a vessel equipped with a reflux condenser, and to the vessel were added 150 ml of distilled water and 10 g of a 27% ammonia aqueous solution. The mixture was then heated and stirred at 75° C. for 20 hours. The slurry was placed in a kneader and kneaded while heating at 80° C. or higher to remove moisture, thereby obtaining a clay-like kneaded product. The resulting kneaded product was extruded by an extruder into a cylindrical shape having a diameter of 1.5 mm. The resulting cylindrical product was dried at 110° C. for one hour and then calcined at 550° C. to obtain a molded support.

Into an eggplant-type flask was placed 50 g of the resulting molded support and then to the flak were injected an impregnation solution containing molybdenum trioxide, nickel(II) nitrate hexahydrate, phosphoric acid (concentration: 85%) and malic acid while deaerating with a rotary evaporator. The impregnated sample was dried at 120° C. for 1 hour and then calcined at 550° C. to obtain an intended catalyst. The constituents of the catalyst prepared are shown in Table 1.

TABLE 1

|  | Catalyst A |
|---|---|
| $Al_2O_3$ Content (% by mass, based on mass of support) | 92 |
| $SiO_2$ Content (% by mass, based on mass of support) | 5 |
| $P_2O_5$ Content (% by mass, based on mass of support) | 3 |
| $MoO_3$ Content (% by mass, based on mass of catalyst) | 22 |
| NiO Content (% by mass, based on mass of catalyst) | 4 |
| $P_2O_5$ Content (% by mass, based on mass of catalyst) | 2 |

(Reaction Apparatus)

In the following Examples and Comparative Examples, the following fixed-bed flow reactors A and B were used.

<Fixed-Bed Flow Reactor A>

The fixed-bed flow reactors A comprises; a raw material feeding pump, a hydrogen supplying apparatus and a pipe which are disposed at the upstream of a reaction tube (having an inner diameter of 20 mm) which can be heated with an electric heater; a cooler, an L-shaped pipe and a pressure regulation valve which are disposed at the downstream of the reaction tube in that order; and a normal pressure gas separator are disposed ahead of the reaction tube. In addition, all the materials of the parts contacted with liquid are SUS 316.

<Fixed-Bed Flow Reactor B>

A reactor, which is prepared in the same manner as that of the fixed-bed flow reactor A except that a chemical agent injection portion is provided between the reaction tube and cooler and the portion from the reaction tube to the chemical agent injection portion is heated with a heater, is used as a fixed-bed flow reactor B. In addition, all the materials of parts contacted by liquid are SUS 316.

Comparative Example 1

The reaction tube filled with 50 ml of the catalyst was fixed in a fixed-bed flow reactor A. Thereafter, the presulfiding of the catalyst was carried out for 4 hours under the conditions of an average temperature of the catalyst layer of 300° C., a hydrogen partial pressure of 6 MPa, a liquid hourly space velocity of 1 h$^{-1}$ and a hydrogen/oil ratio of 200 NL/L using a straight run gas oil (sulfur content: 3% by mass) with dimethylsulfide.

The hydrogenation was carried out by passing palm oil A (the density at 15° C.: 0.917 g/ml, the oxygen content: 11.2% by mass, the chlorine content: 2.1 ppm by mass, the iodine value: 56.4, and the ratio of a compound having a triglyceride structure to an oxygen-containing organic compound: 99.5% by mole) as a feedstock oil through the fixed-bed flow reactor A under the conditions of a reaction temperature of 300° C., an LHSV of 1.0 h$^{-1}$, a hydrogen pressure of 5 MPa and a hydrogen/oil ratio of 500 NL/L. In addition, the temperature inside the L-shaped pipe was 167° C.

Subsequently, water and the reaction product oil were collected from the bottom of the normal pressure gas separator after the hydrogenation and each mass was measured. Further, the results of the gas chromatography analysis of the reaction product oil showed that 10.1 g of water and 84.2 g the hydrocarbon oil were generated per 100 g of the feedstock oil passed, and no unreacted feedstock oil was present. In addition, the measurement showed that the oxygen concentration, chlorine concentration and iodine value in the hydrocarbon oil were 0.1 ppm by mass or less, 0.1% by mass or less and 0.05, respectively. On the other hand, the measurement showed that the chlorine concentration and pH in water were 20.6 ppm by mass and 3.6, respectively.

When the reaction was continued and 880 hours have elapsed from the start of the reaction, leakage of a liquid from the L-shaped pipe was confirmed, and then the reaction was stopped. The L-shaped pipe was inspected in detail and as a result, it was confirmed that a stress corrosion crack due to chlorine occurs.

In addition, the reaction product was analyzed in detail and the decarboxylation reaction was found to proceed. Since the amount of water generated is 4.8 moles, the residual hydrogen amount is 10.1 moles, the amount of propane generated is 1 mole and the amount of carbon dioxide generated is 0.6 moles per one mole of the feedstock oil, the water molar fraction is 0.29. Thus, the condensation temperature at 5 MPa is 194° C. from the formulas (3) and (4) and it is considered that a part of water is condensed to allow corrosion to proceed in the L-shaped pipe.

Example 1

The hydrogenation and the evaluation of the collected product were carried out in the same manner as in the Comparative Example 1 except for using the fixed-bed flow reactor B, passing palm oil B (the density at 15° C.: 0.916 g/ml, the oxygen content: 11.3% by mass, the chlorine content: 7.4 ppm by mass, the iodine value: 51.5, and the ratio of a compound having a triglyceride structure to an oxygen-containing organic compound: 99.6% by mole) as a feedstock oil, introducing an aqueous solution of 1% by mass of ammonia at a rate of 0.12 g/h from a chemical agent injection portion and setting the temperature from the reaction tube to the chemical agent injection portion at 300° C. The introduction amount of ammonia is 2.91 g in terms of nitrogen atom per g of the chlorine content in the feedstock oil. The evaluation results of the collected product showed that 10.2 g (the mass of the aqueous solution introduced from the chemical agent injection portion is subtracted from the mass of water collected) of water and 84.1 g of the hydrocarbon oil were generated per 100 g of the feedstock oil passed and no unreacted feedstock oil was present. In addition, the oxygen concentration, chlorine concentration, nitrogen content and iodine value in the hydrocarbon oil were 0.1 ppm by mass or less, 0.1% by mass or less, 0.1 ppm by mass or less and 0.06, respectively. On the other hand, the chlorine concentration and pH in water were 72.3 ppm by mass and 9.8, respectively. When 4000 hours have elapsed from the start of the reaction, the reaction was stopped. The pipe between the reaction tube and the chemical agent injection portion and the inside of the L-shaped pipe were inspected, and as a result, no corrosion was observed.

Example 2

The hydrogenation and the evaluation of the collected product were carried out in the same manner as in the Example 1 except for using the fixed-bed flow reactor B, filling 300 ml of the catalyst, introducing diethylamine from the chemical agent injection portion at a rate of 0.08 g/h and setting the temperature from the reaction tube to the chemical agent injection portion at 280° C. The introduction amount of diethylamine is 7.64 g in terms of nitrogen atom per gram of the chlorine content in the feedstock oil. The evaluation results of the collected product showed that 10.3 g of water and 84.2 g of the hydrocarbon oil were generated per 100 g of the feedstock oil passed and no unreacted feedstock oil was present. In addition, the oxygen concentration, chlorine concentration, nitrogen content and iodine value in the hydrocarbon oil were 0.1 ppm by mass or less, 0.1% by mass or less, 0.1 ppm by mass or less and 0.06, respectively. On the other hand, the chlorine concentration and pH in water were 71.9 ppm by mass and 11.5, respectively. When 2000 hours have elapsed from the start of the reaction, the reaction was stopped. The pipe between the reaction tube and the chemical agent injection portion and the inside of the L-shaped pipe were inspected, and as a result, no corrosion was observed.

Comparative Example 2

The hydrorefining was carried out in the same manner as in Example 1 except for using a 1% aqueous solution of sodium hydroxide instead of a 1% aqueous solution of ammonia in Example 1. When 192 hours have elapsed from the start of the reaction, the aqueous solution of sodium hydroxide could not be added. The pipe of the chemical agent injection portion was inspected, and as a result, blockage due to sodium hydroxide in a solid state occurred.

The invention claimed is:

1. A method for manufacturing a hydrocarbon oil, comprising:
    a first step wherein a feedstock oil containing an oxygen-containing organic compound and a water-insoluble chlorine-containing compound is brought into contact with a hydrogenation catalyst comprising a support containing a porous inorganic oxide and one or more metals selected from Group VIA and Group VIII of the periodic table supported on the support in the presence of hydrogen to generate a hydrocarbon oil and water in a vapor state by the hydrodeoxygenation of the oxygen-containing organic compound and convert the water-insoluble chlorine-containing compound into a water-soluble chlorine-containing compound;
    a second step wherein the water in the reaction product of the first step is maintained in a vapor state and the reaction product of the first step is brought into contact with a nitrogen-containing Brønsted base compound which has a boiling point at normal pressure of 100° C. or less and is water-soluble, to obtain a product to be treated; and
    a third step wherein the product to be treated is cooled to a temperature not higher than the temperature at which the water in a vapor state is liquefied to form an aqueous phase containing a water-soluble chlorine-containing compound and a nitrogen-containing Brønsted base compound and then separate the aqueous phase from an oil to be treated to obtain a product oil containing a hydrocarbon oil.

2. The method for manufacturing a hydrocarbon oil according to claim 1, wherein an oxygen content in the feedstock oil is 1 to 15% by mass and a chlorine content in the feedstock oil is 0.1 to 50 ppm by mass, based on the total amount of the feedstock oil.

3. The method for manufacturing a hydrocarbon oil according to claim 1, wherein in the first step, 2 to 1200 kg of water is produced as a by-product per gram of a chlorine content in the feedstock oil.

4. The method for manufacturing a hydrocarbon oil according to claim 1, wherein in the second step, the reaction product is brought into contact with 0.4 to 8 g in terms of the nitrogen atom of a nitrogen-containing Brønsted base compound per gram of the chlorine content in the feedstock oil.

5. The method for manufacturing a hydrocarbon oil according to claim 1, wherein the nitrogen-containing Brønsted base compound is ammonia.

6. The method for manufacturing a hydrocarbon oil according to claim 1, wherein the oxygen-containing organic compound contained in the feedstock oil is an oil and fat derived from an animal or vegetable oil and the ratio of a fatty acid and/or a compound having an ester structure in the oil and fat derived from an animal or vegetable oil is 90% by mole or more.

7. The method for manufacturing a hydrocarbon oil according to claim 1, wherein the porous inorganic compound comprises two or more elements selected from aluminum, silicon, zirconium, boron, titanium and magnesium.

8. The method for manufacturing a hydrocarbon oil according to claim 1, wherein in the first step, the feedstock oil and the hydrogenation catalyst are brought into contact together under the conditions of a hydrogen pressure of 2 to 10 MPa, a liquid hourly space velocity of 0.1 to 3.0 $h^{-1}$, a hydrogen/oil ratio of 150 to 1500 NL/L and a reaction temperature of 150 to 380° C.

9. The method for manufacturing a hydrocarbon oil according to claim 1, wherein an oxygen content in the product oil is 1% by mass or less, a chlorine content in the product oil is 0.1 ppm by mass or less and an iodine value in the product oil is 0.1 or less, based on the total amount of the product oil.

\* \* \* \* \*